Nov. 21, 1944.          A. F. WILD            2,363,375
                     BUTTER CONDITIONER
                     Filed Sept. 3, 1942

Inventor:
Albert F. Wild,
by  Harry E. Dunham
His Attorney.

Patented Nov. 21, 1944

2,363,375

UNITED STATES PATENT OFFICE 2,363,375

BUTTER CONDITIONER

Albert F. Wild, Scotia, N. Y., assignor to General Electric Company, a corporation of New York Application September 3, 1942, Serial No. 457,222

3 Claims. (Cl. 257—3)

My invention relates to food-storage receptacles and more particularly to food-storage receptacles for use with refrigerator cabinets.

It has been proposed to provide food-storage receptacles of a type suitable for storing butter or the like at a temperature which will maintain the stored material at a consistency which will enable easy spreading on bread, for example. This necessitates admitting heat to the receptacle in order to maintain the air therein at approximately sixty degrees F. in the case of butter, compared with the usual forty to forty-five degrees F. refrigerator box air temperature.

It is an object of my invention to provide a new and improved food-storage receptacle suitable for storing butter or the like.

Further objects and advantages of my invention will become apparent as the following description proceeds and the features of novelty which characterize my invention will be pointed out with particularity in the claims annexed to and forming a part of this specification.

Figure 1:
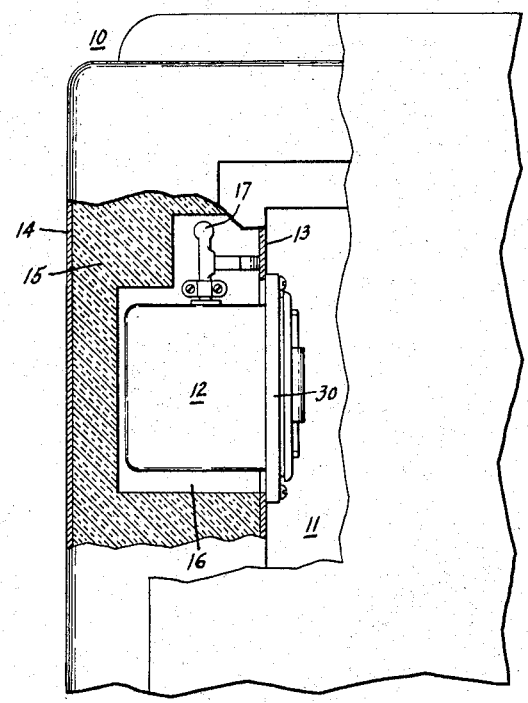
Figure 2:
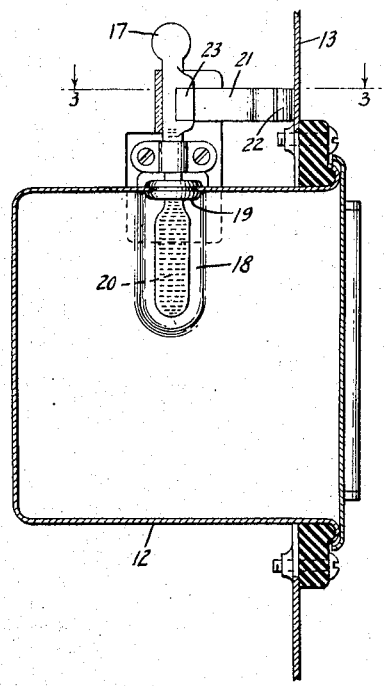
Figure 3:
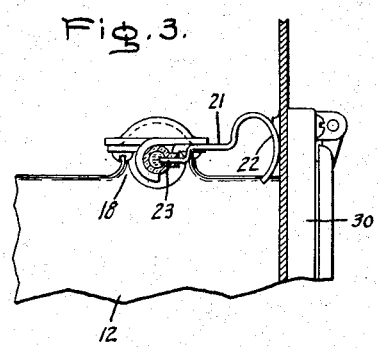
Figure 4:
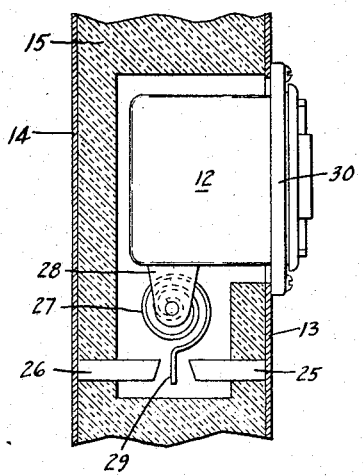

For a better understanding of my invention, reference may be had to the drawing in which Fig. 1 is a partial view, partly in section, of a refrigerator cabinet equipped with a food-storage compartment embodying the principles of my invention, Fig. 2 is an enlarged sectional view of the receptacle shown in Fig. 1, Fig. 3 is a view along the line 3—3 of Fig. 2 and illustrates a detail of the invention shown in Figs. 1 and 2, and Fig. 4 illustrates a second embodiment of my invention.

In the drawing, there is illustrated a refrigerator cabinet 10 of the domestic type having a food-storage compartment 11. A food-storage receptacle 12 is provided for storing butter or the like. Means is provided for conducting or supplying heat from the outside of the cabinet to the receptacle and means is also provided for establishing heat exchange between the receptacle and the interior of the refrigerator upon the attainment of a predetermined temperature. In other words, two sources of heat are provided, one, which may be the outside air, normally above the desired temperature; the other, which may be the refrigerated compartment, normally below the desired temperature. Thus heat exchange may be established between the receptacle and one of these heat sources. The two means cooperate to keep the temperature of the receptacle at a predetermined intermediate value.

Describing my invention in greater detail, the food-storage compartment 11 of the refrigerator cabinet 10 is defined by a thermally conductive inner liner or wall 13 and a thermally conductive outer casing or wall 14, the space between the liner and the casing being filled with a suitable thermal insulating material 15. Suitable means for refrigerating the compartment 11 may be provided but, inasmuch as the details thereof form no part of my present invention, it is believed unnecessary to illustrate any specific system.

As best seen in Fig. 1, the storage receptacle 12 is disposed within a recess 16 in the insulation. This recess is provided by thinning out the insulation in the vicinity of the receptacle so that the rate of heat exchange through the insulation at that point will be greater than that taking place through the main body of the insulating material. The amount of insulation provided at the thinned out portion is so chosen that the receptacle 12 will normally be at a higher temperature than desirable but for the fact that means is provided for placing the receptacle into heat-exchange relationship with the compartment 11.

In the form of my invention illustrated in Figs. 1 to 3, inclusive, the last-mentioned means comprises a hollow elongated chamber 17 which may be formed of glass or any other suitable material into any desired shape. The chamber is disposed in heat-exchange relationship with the receptacle 12 in any desired manner. I have illustrated the chamber or member 17 as being disposed in a recess 18 formed in the wall of the receptacle 12 and extending upwardly through the upper wall of the receptacle so that the lower portion is in heat-exchange relationship with a portion of the inner surface of the receptacle and also the air therein. The member 17 may be suitably sealed where it passes through the receptacle wall, as indicated by the numeral 19, in order to minimize the exchange of heat through the opening in the receptacle wall. Within the chamber, there is provided a heat-responsive heat-conductive fluid of a type which will expand with increase in temperature, as mercury, for example. There is provided a member 21 formed from a material which will readily conduct heat, one portion 22 of which is suitably disposed in heat-exchange relationship with the inner liner 13 and another portion 23 of which extends into the chamber 17. Any suitable seal may be provided at the place where the member 21 extends through the walls of the chamber. A sufficient amount of liquid or fluid 20 is provided so that, at the desired temperature, the level of the fluid will be just below the portion 23 of the heat-conductivity member 21. Accordingly, it will be seen that an increase of temperature within the receptacle 12 will cause the fluid 20 to expand into heat-exchange relationship with the member 21, thereby placing the receptacle into heat-exchange relationship with the food-storage compartment. By providing the portion 23 with a substantial area, substantial increases of heat within the receptacle may be taken care of quickly. When the temperature falls to the desired level, the fluid will contract and the heat exchange through the member 21 will be discontinued. It will be understood that if a metal door 30 is employed with the receptacle, a considerable amount of heat will be lost through the door of the receptacle to the air in the food-storage compartment. If desired, the door may be made from a material having relatively poor heat conductivity characteristics. In any case, the amount of insulation between the receptacle and the outer liner 14 is chosen so as more than to counteract any heat loss to the cooler storage compartment.

The structural details of the receptacle and the heat-conducting means including the chamber 17 and the member 21 may be varied according to desire. For example, the member 21 may be secured to the inner liner as by means of soldering or welding, for example, or the member 21 may be in the form of a resilient springlike member having resilient engagement with the inner liner.

A different form of temperature control is illustrated in Fig. 4. In this embodiment of my invention, there is provided a pair of heat-conductive members 25 and 26 having intimate thermal engagement with the inner liner 13 and outer casing 14, respectively, and extending toward each other in the insulation space. There is also provided a suitable heat responsive heat-conductive member 27 having a portion disposed in intimate thermal engagement with the receptacle 12 and having a portion extending into the space or gap between the free ends of the members 25 and 26. In the illustrated example of this embodiment of my invention, the heat-responsive member takes the form of a coiled bimetallic strip, one end of which is suitably secured to the receptacle 12 as by means of a bracket 28. The free end of the coil is disposed between the ends of the members 25 and 26. As shown in Fig. 4, the parts are so arranged that, when the temperature of the receptacle 12 is approximately the desired value, the free end 29 of the heat-responsive element has no engagement with either member 25 or member 26. However, if the temperature of the receptacle decreases, the coil will tend to contract so that the free end 29 will move toward the left into engagement with the member 26 and provide a heat-conductive path from the outside of the food-storage compartment to the receptacle 12 to permit the flow of heat to the receptacle. On the other hand, if the temperature of the receptacle is above the desired value, the member 27 will tend to uncoil and the free end will move into engagement with the member 25, thereby providing a heat-conductive path between the receptacle and the low temperature compartment 11 whereby heat will tend to be conducted away from the receptacle.

Other modifications of my invention are possible. The arrangements above described are advantageous in that no electrical heating means is utilized, thereby simplifying the arrangement of the receptacle and cabinet. However, other applications will readily occur to those skilled in the art and, while I have shown particular embodiments of my invention, I do not desire my invention to be limited to the particular construction shown and described and I intend in the appended claims to cover all modifications within the spirit and scope of my invention.

What I claim as new and desire to secure by Letters Patent of the United States is:

1. In a refrigerator cabinet of the type having an outer wall, an inner wall defining a food-storage compartment, thermal insulation between said walls for facilitating the maintenance of a difference in temperature between the inner and outer walls, means for refrigerating the food-storage compartment, a food-storage receptacle for butter or the like arranged in said cabinet, a heat-conductive heat-responsive member in thermal relationship with said receptacle, and means for causing said member to move into heat-exchange relationship with said outer wall at receptacle temperatures below the desired value and for moving into heat-exchange relationship with said inner wall at temperatures above said desired value.

2. In a refrigerator cabinet of the type having an outer wall, an inner wall defining a food-storage compartment, thermal insulation between said walls for facilitating the maintenance of a difference in temperature between the inner and outer walls, means for refrigerating the food-storage compartment, a food-storage receptacle for butter or the like arranged in said cabinet, heat-conductive members disposed in intimate thermal relationship with said inner and outer walls and extending toward each other, and a heat-responsive heat-conductive member having thermal engagement with said receptacle and having a portion extending into the space between said members, said members being arranged in such a manner that the heat-responsive member will engage the heat-conductive member associated with the inner wall when the temperature of the receptacle is above the desired value and will engage the heat-conductive member associated with the outer wall when the receptacle temperature is below said desired value.

3. In a refrigerator cabinet having a refrigerated food storage compartment, means for maintaining one portion of the cabinet at a lower temperature than another portion thereof, a receptacle for butter or the like arranged within said cabinet, and means for maintaining said receptacle at a temperature intermediate the temperatures of said portions of said cabinet, said means including a member arranged to provide heat conducting paths alternately between said receptacle and each of said portions of said cabinet and including temperature responsive means for establishing the path between said one portion and said receptacle for temperatures above a predetermined value and between said other portion and said receptacle for temperatures below said predetermined value.

ALBERT F. WILD.